(12) United States Patent
Yoshida et al.

(10) Patent No.: US 11,794,767 B2
(45) Date of Patent: Oct. 24, 2023

(54) VEHICLE DISPLAY DEVICE

(71) Applicant: Yazaki Corporation, Tokyo (JP)

(72) Inventors: Akihiro Yoshida, Shizuoka (JP);
Shinichi Okamoto, Shizuoka (JP);
Yoshiharu Matsuo, Shizuoka (JP);
Sosuke Yamamoto, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/671,563

(22) Filed: Feb. 14, 2022

(65) Prior Publication Data

US 2022/0289224 A1 Sep. 15, 2022

(30) Foreign Application Priority Data

Mar. 10, 2021 (JP) ................................. 2021-037890

(51) Int. Cl.
*B60W 50/14* (2020.01)
*B60W 30/095* (2012.01)
*B60W 40/04* (2006.01)
*B60K 35/00* (2006.01)

(52) U.S. Cl.
CPC ............ *B60W 50/14* (2013.01); *B60K 35/00* (2013.01); *B60W 30/0956* (2013.01); *B60W 40/04* (2013.01); *B60K 2370/1868* (2019.05); *B60W 2050/146* (2013.01); *B60W 2554/4046* (2020.02); *B60W 2555/20* (2020.02)

(58) Field of Classification Search
CPC .. B60W 50/14; B60W 30/0956; B60W 40/04; B60W 2555/20; B60W 2554/4046; B60W 2050/146; B60K 35/00; B60K 2370/1868
See application file for complete search history.

(56) References Cited

U.S. PATENT DOCUMENTS

| | | | |
|---|---|---|---|
| 10,692,149 B1* | 6/2020 | Loo .................. | G06Q 40/08 |
| 2014/0277833 A1* | 9/2014 | Palan ................. | G07C 5/0866 |
| | | | 701/1 |
| 2017/0168503 A1* | 6/2017 | Amla ................. | G05D 1/0011 |
| 2017/0282915 A1* | 10/2017 | Kim ................... | B60W 30/09 |
| 2017/0372189 A1* | 12/2017 | Joo .................... | B60W 50/0098 |

(Continued)

FOREIGN PATENT DOCUMENTS

DE 11 2016 003 387 T5 4/2018
DE 10 2020 119 541 A1 1/2021

(Continued)

*Primary Examiner* — Chico A Foxx
(74) *Attorney, Agent, or Firm* — KENEALY VAIDYA LLP

(57) ABSTRACT

A vehicle display device includes: an acquisition unit that acquires a travel environment; a prediction unit that predicts a behavior of another vehicle traveling ahead of a vehicle of a driver, based on the travel environment; and a display unit that, when the behavior of the other vehicle is predicted to become unstable, displays the predicted behavior of the other vehicle to the driver of the vehicle. The vehicle display device may include: a prediction unit that predicts a behavior of a vehicle, based on the travel environment; and a display unit that, when the behavior of the vehicle is predicted to become unstable, displays the predicted behavior of the vehicle to a driver of the vehicle.

7 Claims, 9 Drawing Sheets

(56) References Cited

U.S. PATENT DOCUMENTS

| | | | |
|---|---|---|---|
| 2018/0210447 A1* | 7/2018 | Myers | B60W 40/02 |
| 2018/0222424 A1 | 8/2018 | Kodama et al. | |
| 2018/0336785 A1* | 11/2018 | Ghannam | G08G 1/04 |
| 2018/0370530 A1* | 12/2018 | Ishikawa | B60W 30/095 |
| 2019/0202473 A1* | 7/2019 | Kaji | B60W 50/12 |
| 2020/0168099 A1* | 5/2020 | Yamaguchi | G08G 1/167 |
| 2020/0189614 A1* | 6/2020 | Ito | H04S 7/303 |
| 2020/0192403 A1* | 6/2020 | Silver | G01S 17/95 |
| 2020/0255011 A1* | 8/2020 | Sato | B60W 30/14 |
| 2021/0024069 A1 | 1/2021 | Herman et al. | |
| 2021/0039637 A1 | 2/2021 | Seo | |
| 2021/0049908 A1* | 2/2021 | Pipe | G08G 1/0112 |
| 2022/0097713 A1* | 3/2022 | Neubecker | B60W 40/02 |
| 2022/0126867 A1* | 4/2022 | Han | G01P 5/00 |
| 2022/0126875 A1* | 4/2022 | Hammoud | B60W 30/09 |
| 2022/0315027 A1* | 10/2022 | Behring | B60K 35/00 |
| 2022/0348196 A1* | 11/2022 | Foltin | B60W 50/0098 |
| 2022/0388542 A1* | 12/2022 | Uno | B60W 60/0017 |

FOREIGN PATENT DOCUMENTS

| | | | | |
|---|---|---|---|---|
| JP | 2006-85285 A | 3/2006 | | |
| JP | 2008-70998 A | 3/2008 | | |
| JP | 2015-41242 A | 3/2015 | | |
| JP | 2020-201647 A | 12/2020 | | |
| WO | WO-2013027273 A1 * | 2/2013 | | G01C 21/3691 |
| WO | 2018/020546 A1 | 2/2018 | | |
| WO | WO-2018020546 A1 * | 2/2018 | | B60K 35/00 |

* cited by examiner

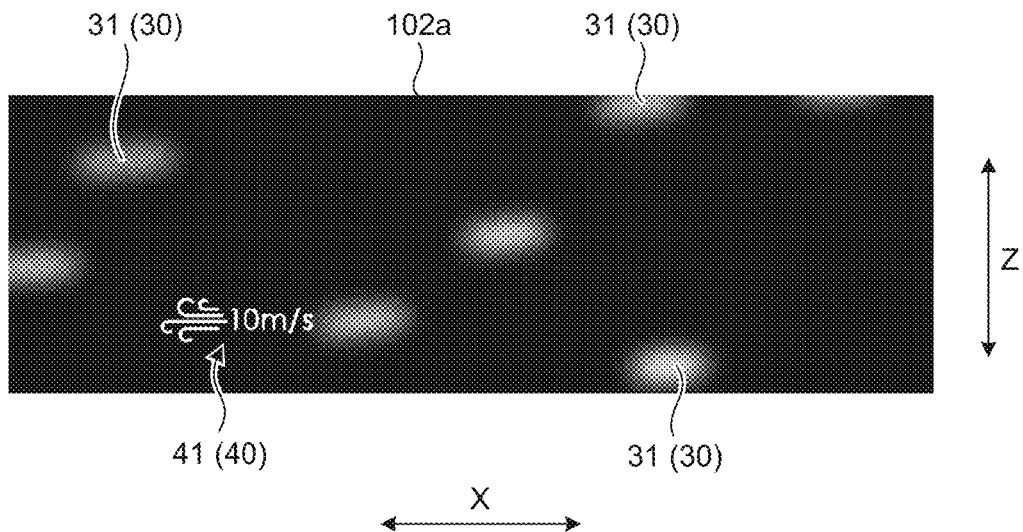

VEHICLE DISPLAY DEVICE

CROSS-REFERENCE TO RELATED APPLICATION(S)

The present application claims priority to and incorporates by reference the entire contents of Japanese Patent Application No. 2021-037890 filed in Japan on Mar. 10, 2021.

BACKGROUND OF THE INVENTION

1. Field of the Invention

The present invention relates to a vehicle display device.

2. Description of the Related Art

A technique of displaying a wind direction has been used conventionally. WO2018/020546 discloses a display control device including a weather information acquisition unit and a display control unit that controls to display wind information including a wind direction in a stereoscopically visible manner on the basis of the weather information acquired by the weather information acquisition unit. According to WO2018/020546, a driver can understand the wind direction intuitively.

It has been desired that the driver can intuitively understand the influence of a travel environment such as wind on the driver's vehicle.

SUMMARY OF THE INVENTION

It is an object of the present invention to provide a vehicle display device that enables the driver to intuitively understand the influence of the travel environment on the driver's vehicle.

In order to solve the above mentioned problem and achieve the object, a vehicle display device according to one aspect of the present invention includes an acquisition unit that acquires a travel environment; a prediction unit that predicts a behavior of another vehicle traveling ahead of a vehicle of a driver, based on the travel environment; and a display unit that, when the behavior of the other vehicle is predicted to become unstable, displays the predicted behavior of the other vehicle to the driver of the vehicle.

In order to achieve the object, a vehicle display device according to another aspect of the present invention includes an acquisition unit that acquires a travel environment; a prediction unit that predicts a behavior of a vehicle, based on the travel environment; and a display unit that, when the behavior of the vehicle is predicted to become unstable, displays the predicted behavior of the vehicle to a driver of the vehicle.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram illustrating a plurality of display figures displayed in a display area;

FIG. 4 is a diagram illustrating the display figures and icons in the embodiment;

FIG. 12 is a diagram illustrating the first animation according to weather;

DETAILED DESCRIPTION OF THE PREFERRED EMBODIMENTS

A vehicle display device according to an embodiment of the present invention is hereinafter described in detail with reference to the drawings. Note that the present invention is not limited by the embodiment. In addition, the components in the following embodiment include the component that a person skilled in the art can easily conceive, or substantially the same component.

Embodiment

Figure 1:
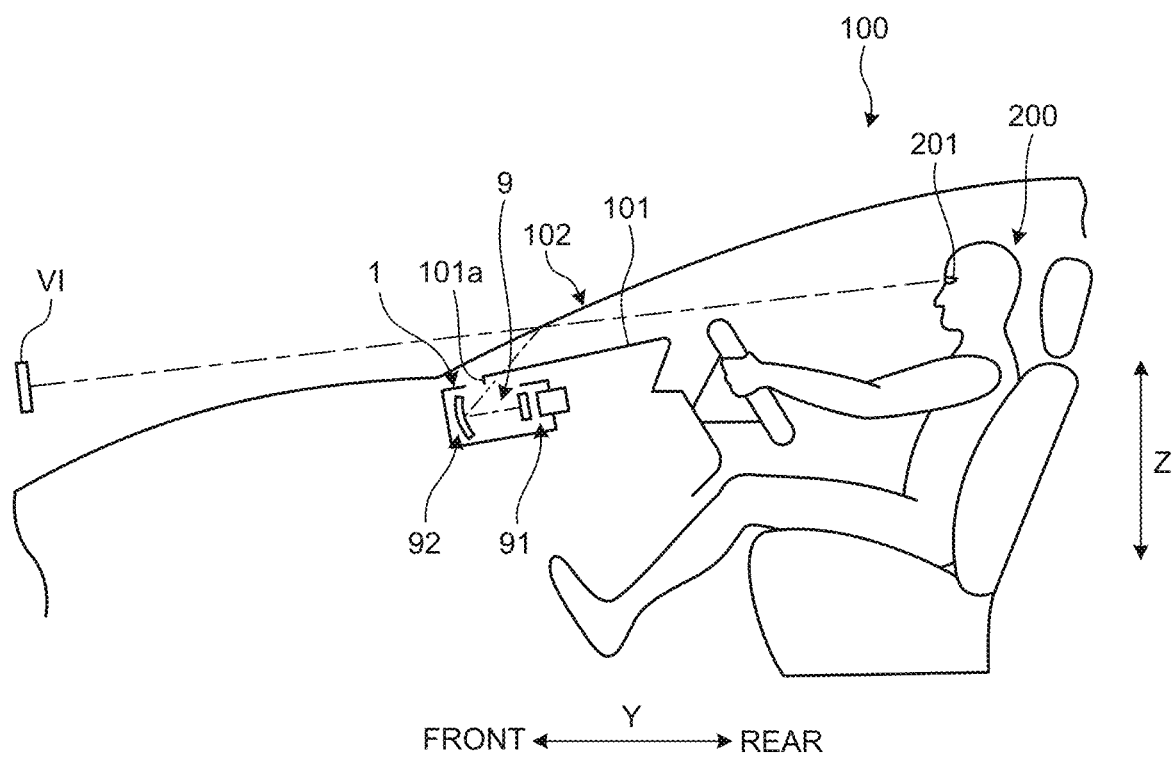
FIG. 1 is a diagram illustrating a vehicle on which a vehicle display device according to one embodiment is mounted.
Figure 2:
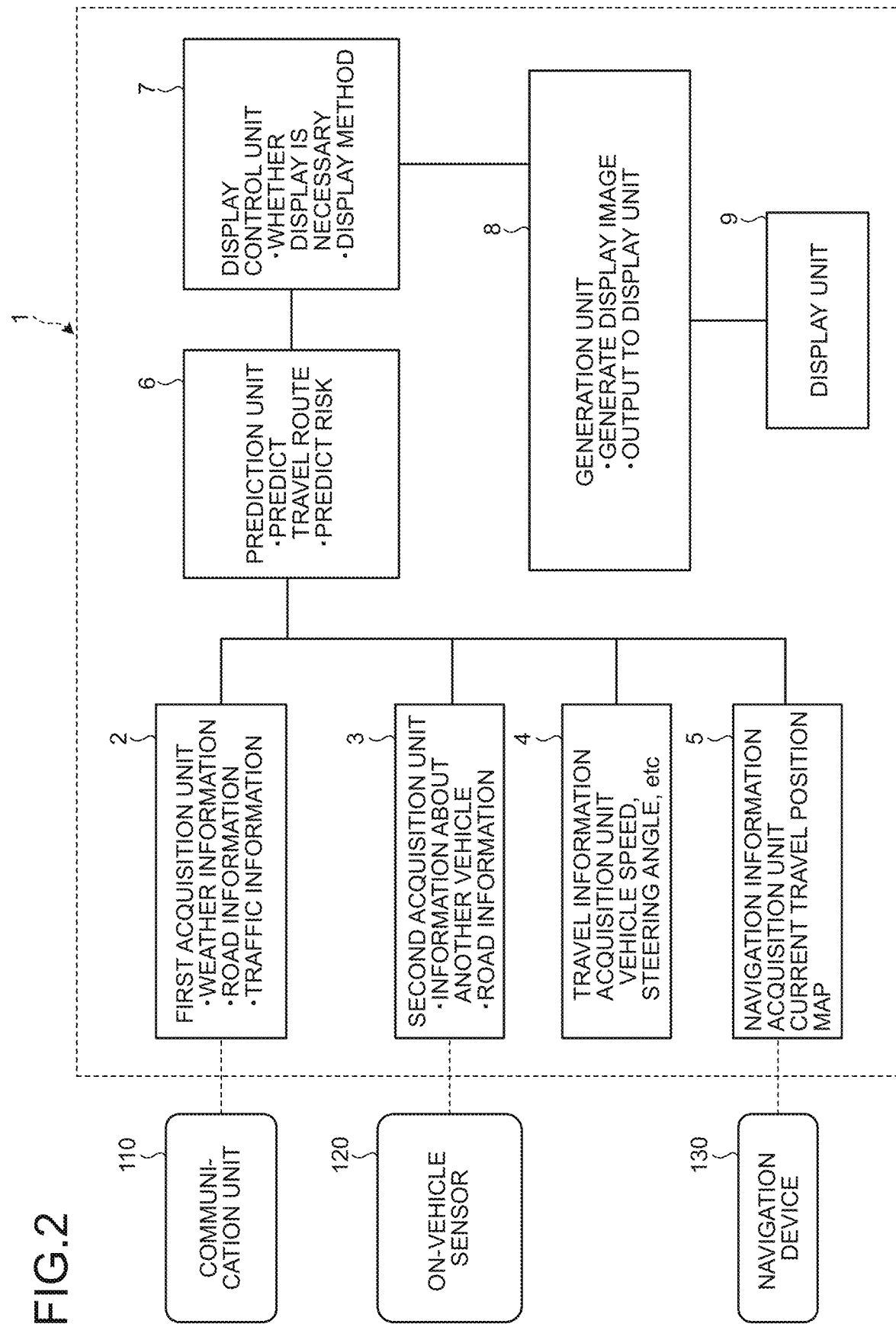
FIG. 2 is a block diagram of the vehicle display device according to the embodiment.
Figure 5:
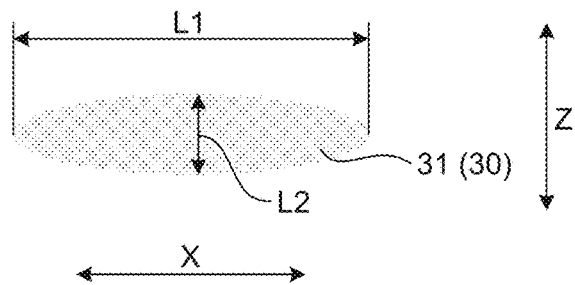
FIG. 5 is a diagram for describing the flatness ratio of the display figure.
Figure 6:
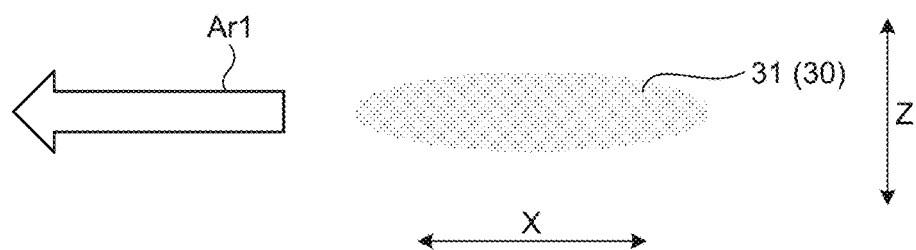
FIG. 6 is a diagram illustrating a moving direction of the display figure.
Figure 7:
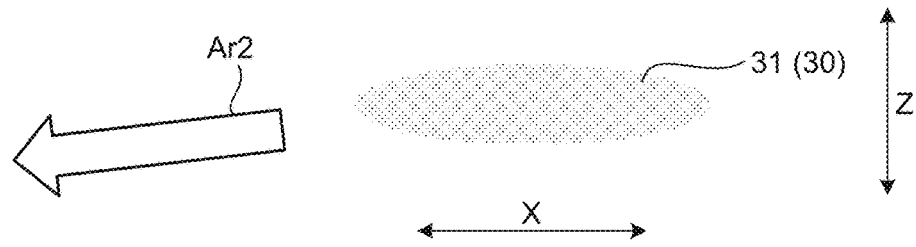
FIG. 7 is a diagram illustrating the moving direction of the display figure.
Figure 8:
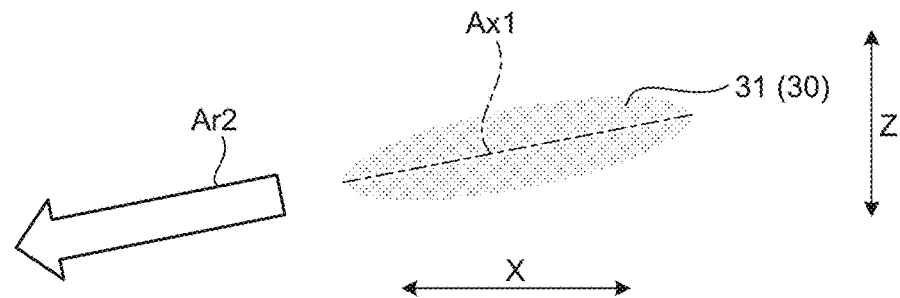
FIG. 8 is a diagram illustrating the display figure with a tilted long axis.
Figure 9:
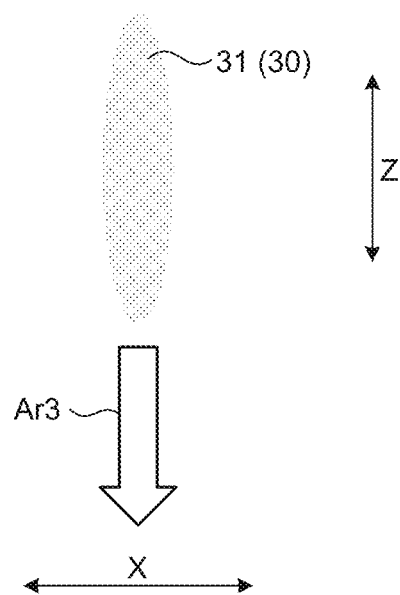
FIG. 9 is a diagram illustrating the display figure for wind in an up-down direction.
Figure 10:
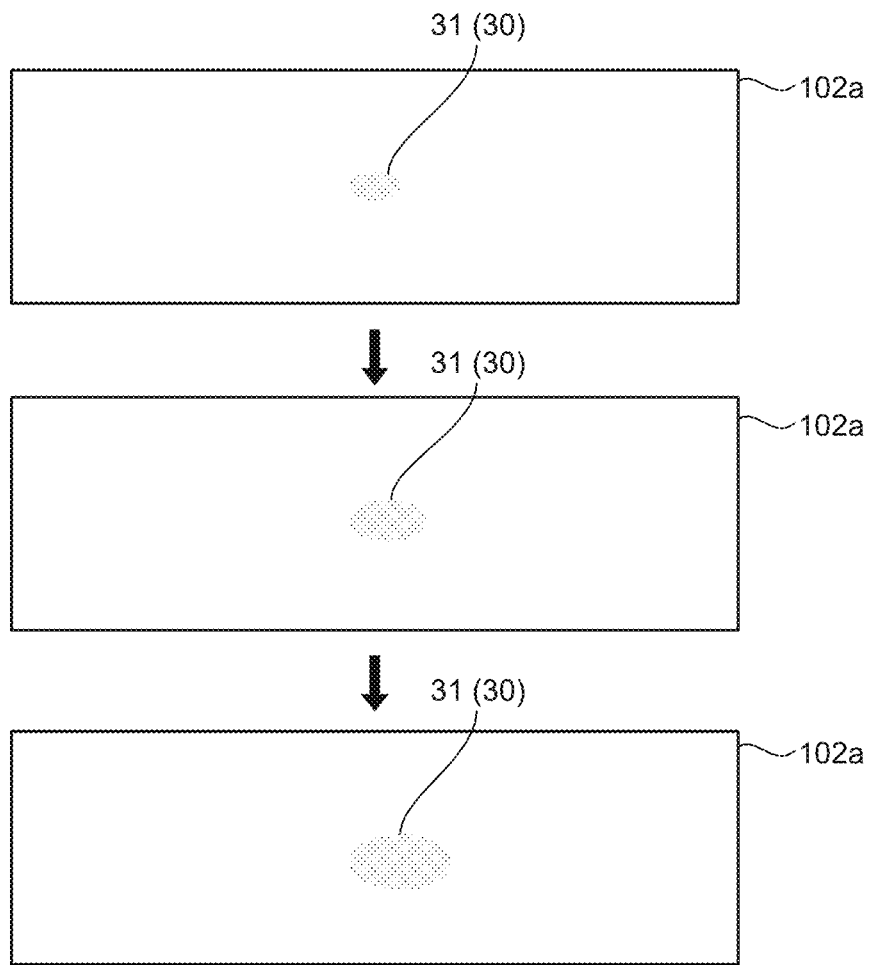
FIG. 10 is a diagram for describing the display figure when a contrary wind is blowing.

One embodiment is described with reference to FIG. 1 to FIG. 17. The present embodiment is related to a vehicle display device. FIG. 1 is a diagram illustrating a vehicle on which the vehicle display device according to the embodiment is mounted. FIG. 2 is a block diagram of the vehicle display device according to the embodiment. FIG. 3 is a diagram illustrating a plurality of display figures displayed in a display area. FIG. 4 is a diagram illustrating the display figures and icons in the embodiment. FIG. 5 is a diagram for describing the flatness ratio of the display figure. FIG. 6 is a diagram illustrating a moving direction of the display figure. FIG. 7 is a diagram illustrating the moving direction of the display figure. FIG. 8 is a diagram illustrating the display figure with a tilted long axis. FIG. 9 is a diagram illustrating the display figure for wind in an up-down direction. FIG. 10 is a diagram for describing the display figure when a contrary wind is blowing.

As illustrated in FIG. 1, a vehicle display device according to the embodiment is mounted on a vehicle 100. The vehicle display device 1 according to the embodiment is what is called a head-up display, device. The vehicle display device 1 displays a virtual image VI ahead of an eye point 201 in the vehicle 100. The eye point 201 is a position that is defined in advance as a viewpoint position of a driver 200 who is seated on a driver's seat.

The vehicle display device 1 is disposed inside a dashboard 101 of the vehicle 100. The dashboard 101 has an opening 101a provided on an upper surface thereof. The vehicle display device 1 projects display light of an image on a windshield 102 through this opening 101a. The windshield 102 is a reflection part that is positioned ahead of the eye point 201 in the vehicle 100. For example, the windshield 102 has a semi-transmitting property and reflects the display light that comes from the vehicle display device 1 to the eye point 201. The driver 200 recognizes the image reflected by the windshield 102 as the virtual image VI. The driver 200 recognizes the virtual image VI as if the virtual image VI existed ahead of the windshield 102.

Note that in the present specification, "front-rear direction" is a vehicle front-rear direction of the vehicle 100 on which the vehicle display device 1 is mounted, unless otherwise stated. In addition, "vehicle width direction" is a vehicle width direction of the vehicle 100 and "up-down direction" is a vehicle up-down direction of the vehicle 100, unless otherwise stated.

As illustrated in FIG. 2, the vehicle display device 1 includes a first acquisition unit 2, a second acquisition unit 3, a travel information acquisition unit 4, a navigation information acquisition unit 5, a prediction unit 6, a display control unit 7, a generation unit 8, and a display unit 9. For example, the first acquisition unit 2, the second acquisition unit 3, the travel information acquisition unit 4, the navigation information acquisition unit 5, the prediction unit 6, the display control unit 7 and the generation unit 8 are computers including a calculation unit, a storage unit, a communication interface, and the like. For example, the first acquisition unit 2, the second acquisition unit 3, the travel information acquisition unit 4, the navigation information acquisition unit 5, the prediction unit 6, the display control unit 7, and the generation unit 8 operate on the basis of computer programs stored in advance.

The first acquisition unit 2 acquires weather information, road information, and traffic information through a communication unit 110 of the vehicle 100. The weather information and the road information acquired by the first acquisition unit 2 are samples of travel environments that affect the travel of the vehicle 100 and the travel of other vehicles. The communication unit 110 performs vehicle to everything (V2X) communication. For example, the communication unit 110 can communicate wirelessly with an infrastructure system by road to vehicle communication. The communication unit 110 can communicate wirelessly with other vehicles by vehicle to vehicle communication. In addition, the communication unit 110 may be connected to a cloud network by wireless communication with a communication base station. The communication unit 110 performs the wireless communication in accordance with an arbitrary communication standard.

The weather information acquired by the first acquisition unit 2 is information at a predetermined position ahead of the vehicle 100. The predetermined position corresponds to an exit of a tunnel, an underpass, a bridge, an elevated road, a coastal road, a building area, a mountain road, or the like. The weather information includes information about the speed and direction of wind, information about whether it is raining and the amount of rainfall, information about whether it is snowing and the amount of snowfall, and information about temperature. The wind speed and the wind direction are detected by an anemometer provided at the predetermined position, for example.

The first acquisition unit 2 according to the present embodiment calculates wind components in three directions on the basis of the wind speed and the wind direction. The three directions are a vehicle width direction X of the vehicle 100, a traveling direction Y of the vehicle 100, and an up-down direction Z of the vehicle 100. The vehicle width direction X, the traveling direction Y, and the up-down direction Z are orthogonal to each other. On the basis of the wind speed and the wind direction at the predetermined position, the first acquisition unit 2 divides the wind blowing at the predetermined position into a first wind component along the vehicle width direction X, a second wind component along the traveling direction Y, and a third wind component along the up-down direction Z.

The road information acquired by the first acquisition unit 2 is information about a road surface condition at the predetermined position ahead of the vehicle 100. For example, the road information includes information about freezing of a road surface, information about a puddle on the road surface, and information about submergence of the road surface. The traffic information acquired by the first acquisition unit 2 is traffic information about the periphery of the vehicle 100. For example, the traffic information includes information about the position of another vehicle existing near the vehicle 100, the vehicle type of the other vehicle, and the traveling direction of the other vehicle.

The second acquisition unit 3 acquires the road information and the information about the other vehicle existing in the periphery through an on-vehicle sensor 120 mounted on the vehicle 100. The road information acquired by the second acquisition unit 3 is one example of the travel environments that affect the travel of the vehicle 100 and the travel of the other vehicle. For example, the on-vehicle sensor 120 includes a sensor that detects the relative position or the relative speed of the other vehicle with respect to the vehicle 100 corresponding to a driver's vehicle. Examples of such a sensor include laser imaging detection and ranging (LIDAR) and a radar sensor. The on-vehicle sensor 120 may include a sensor that detects the shape of the other vehicle. The on-vehicle sensor 120 may include a camera that photographs the periphery of the vehicle 100. The second acquisition unit 3 acquires the information about the other vehicle and the road information on the basis of a detection result from the on-vehicle sensor 120.

The travel information acquisition unit 4 acquires travel information of the vehicle 100 corresponding to the driver's vehicle. For example, the travel information is the vehicle speed and the steering angle of the vehicle 100. For example, the travel information acquisition unit 4 acquires the travel information from a vehicle speed sensor or a steering angle sensor mounted on the vehicle 100.

The navigation information acquisition unit 5 acquires a current travel position of the vehicle 100, map information, or guide route information. For example, the navigation information acquisition unit 5 acquires various kinds of information from a navigation device 130 mounted on the vehicle 100. The navigation information acquisition unit 5 may acquire the information from a mobile navigation device or a navigation application in a smartphone.

The prediction unit 6 predicts a travel route or a risk. The prediction unit 6 performs various kinds of predictions on the basis of the information acquired by the first acquisition unit 2, the second acquisition unit 3, the travel information acquisition unit 4, and the navigation information acquisition unit 5. For example, the prediction unit 6 predicts the travel route of the vehicle 100 or the travel route of another vehicle. In addition, the prediction unit 6 predicts the risk on the basis of the wind speed, the wind direction, or the like.

The display control unit 7 decides whether to display the alert to the driver 200 in the vehicle 100. The display control unit 7 determines whether to display the alert on the basis of a prediction result from the prediction unit 6. When displaying the alert, the display control unit 7 decides a display method for the alert. When displaying the alert, the display control unit 7 orders the generation unit 8 the display method for the alert.

The generation unit 8 generates a display image and outputs the generated display image to the display unit 9. The generation unit 8 according to the present embodiment generates display figures 30 expressing the weather. FIG. 3 illustrates one example of an icon 40 and the display figures 30 displayed as the virtual image. In the example in FIG. 3, the display figures 30 are dispersedly displayed in a display area 102a, and one icon 40 is displayed in the display area 102a. The display area 102a is an area where the virtual image VI can be displayed by the display unit 9. The display area 102a in this example has a rectangular shape. As the wind speed at the predetermined position is higher, the display area 102a may display more display figures 30. The transmissivity of the display figure 30 may be increased as more display figures 30 are displayed.

The display figure 30 in this example is an image expressing that a side wind exists. The generation unit 8 according to the present embodiment generates the display figure 30 and the icon 40 whose shapes are different depending on the weather. FIG. 4 illustrates the shapes of the display figures 30 and the icons 40 according to weather. As illustrated in FIG. 4, the display figures 30 include a display figure 31 for wind, a display figure 32 for wind and rain, and a display figure 33 for wind and snow.

The display figure 31 for wind is a figure that is displayed when it is not raining or snowing at the predetermined position or when neither rainfall nor snowfall is predicted at the predetermined position. Note that the display figure 31 for wind may be displayed when a strong wind is observed at the predetermined position or when a tornado is observed at or near the predetermined position. The display figure 31 for wind in this example has a circular shape. The display figure 31 for wind is displayed in white or white-like color. The display figure 31 for wind may be displayed in light gray.

The display figure 32 for wind and rain is a figure that is displayed when it is raining at the predetermined position or when rainfall is predicted at the predetermined position. Note that the display figure 32 for wind and rain may be displayed when a heavy rain or a local torrential rain is observed at the predetermined position. The display figure 32 for wind and rain may be displayed when a flood, submergence, or a storm surge is observed or predicted at the predetermined position. The display figure 32 for wind and rain in this example has a raindrop shape. The display figure 32 for wind and rain is displayed in light blue-like color.

The display figure 33 for wind and snow is a figure that is displayed when it is snowing at the predetermined position or when snowfall is predicted at the predetermined position. Note that the display figure 33 for wind and snow may be displayed when hail or graupel falls at the predetermined position or when the road is frozen at the predetermined position. The display figure 33 for wind and snow in this example has a hexagonal shape. The display figure 33 for wind and snow is displayed in white or white-like color, for example.

The generation unit 8 adjusts the flatness ratio of the display figure 30 in accordance with the wind speed and the wind direction at the predetermined position. More specifically, when the wind at the predetermined position includes the side wind, the generation unit 8 generates the display figure 30 with a flat and horizontally long shape. By the display of the display figure 30 with a flat and horizontally long shape, the driver 200 can easily know that the side wind is blowing.

As the side wind at the predetermined position is stronger, the generation unit 8 according to the present embodiment increases the flatness ratio F of the display figure 30. When the length of the long axis of the display figure 30 is L1 and the length of the short axis of the display figure 30 is L2, for example, the flatness ratio F is expressed by the following expression (1). That is to say, when the side wind is strong, the generation unit 8 generates the display figure 30 that is long and narrow along the vehicle width direction X. By making the display figure 30 flatter as the side wind is stronger, the vehicle display device 1 according to the present embodiment can alert the driver to the side wind.

$$F=(L1-L2)/L1 \tag{1}$$

Note that the generation unit 8 may adjust the flatness ratio F in accordance with the degree of the side wind. The generation unit 8 may change the display angle of the display figure in accordance with the strength of the side wind and the strength of the wind in the up-down direction.

In addition, the generation unit 8 moves the display figure 30 in accordance with the wind direction at a cross section that is orthogonal to the traveling direction Y of the vehicle 100. In the description below, the cross section that is orthogonal to the traveling direction Y is referred to as "predetermined cross section" simply. The predetermined cross section is a cross section along the vehicle width direction X and the up-down direction Z. When the side wind is blowing without the third wind component along the up-down direction Z, the generation unit 8 moves the display figure 30 horizontally along the vehicle width direction X as indicated by an arrow Ar1 in FIG. 6.

When the third wind component exists in addition to the first wind component corresponding to the side wind, the generation unit 8 moves the display figure 30 in an oblique direction as indicated by an arrow Ar2 in FIG. 7. For example, the moving direction indicated by the arrow Ar2 is a direction of a vector combining a vector of the first wind component and a vector of the second wind component. By moving the display figure 30 in accordance with the wind direction, the vehicle display device 1 according to the present embodiment enables the driver to understand the wind direction intuitively.

The generation unit 8 changes the moving speed of the display figure 30 in accordance with the wind speed at the predetermined cross section. For example, as the wind speed at the predetermined cross section is higher, the generation unit 8 increases the moving speed of the display figure 30. By changing the moving speed of the display figure 30 in accordance with the wind speed, the vehicle display device 1 according to the present embodiment enables the driver to understand the strength of the wind intuitively.

The generation unit 8 may tilt the display figure 30 in accordance with the wind direction at the predetermined cross section. For example, the display figure 30 illustrated in FIG. 8 includes a long axis Ax1 that tilts with respect to the vehicle width direction X. For example, the direction of the long axis Ax1 is the same as the moving direction indicated by the arrow Ar2.

Note that when the wind in the up-down direction Z exists and the side wind does not exist at the predetermined position, the generation unit 8 may generate the display figure 30 with a vertically long shape as illustrated in FIG. 9. In this case, the generation unit 8 may move the display figure 30 along the up-down direction Z as indicated by an arrow Ar3.

When the second wind component along the traveling direction Y exists, the generation unit 8 plays the animation of changing the size of the display figure 30, which is described below. FIG. 10 illustrates the change of the size of the display figure 30 when the wind at the predetermined position is a contrary wind with respect to the vehicle 100. To express the contrary wind by the display figure 30, the generation unit 8 increases the size of the display figure 30 in accordance with the lapse of time. For example, the generation unit 8 changes the size of the display figure 30 while keeping the flatness ratio F of the display figure 30 constant. By changing the size of the display figure 30, the driver can intuitively understand the wind direction along the traveling direction Y. When the wind at the predetermined position is a following wind with respect to the vehicle 100, the generation unit 8 may reduce the size of the display figure 30 in accordance with the lapse of time.

The icon 40 is displayed in the display area 102a together with the display figure 30, and includes letters expressing the weather information. As illustrated in FIG. 4, the icon 40 includes an icon 41 for wind, an icon 42 for wind and rain, and an icon 43 for wind and snow.

The icon 41 for wind is displayed with the display figure 31 for wind. The icon 41 for wind in this example includes a figure expressing the wind and letters expressing the wind speed. Note that when the tornado exists at the predetermined position, the generation unit 8 generates an icon 44 expressing the tornado instead of the icon 41 for wind. The icon 44 expressing the tornado includes a figure expressing the tornado and letters expressing the tornado. For example, the icon 41 for wind and the icon 44 for the tornado are displayed in the same color as the display figure 31 for wind.

The icon 42 for wind and rain is displayed together with the display figure 32 for wind and rain. The icon 42 for wind and rain in this example includes a figure expressing the rain and letters expressing the wind speed. For example, the icon 42 for wind and rain is displayed in the same color as the display figure 32 for wind and rain. The icon 43 for wind and snow is displayed together with the display figure 33 for wind and snow. The icon 43 for wind and snow includes letters expressing the snow and letters expressing the wind speed. For example, the icon 43 for wind and snow is displayed in the same color as the display figure 33 for wind and snow.

The generation unit 8 according to the present embodiment adjusts the size of the display figure 30 in accordance with the distance from the vehicle 100 to the predetermined position. For example, if the distance from the vehicle 100 to the predetermined position is small, the generation unit 8 enlarges the size of the display figure 30. On the other hand, if the distance from the vehicle 100 to the predetermined position is large, the generation unit 8 reduces the size of the display figure 30. By expressing the perspective as described above, the driver 200 can recognize whether the distance from the current position to the predetermined position is large or small. For example, as the distance from the vehicle 100 to the predetermined position is smaller, the generation unit 8 enlarges the size of the display figure 30 gradually.

Note that if the display unit 9 includes a mechanism that adjusts an image formation position of the virtual image VI, the perspective can be expressed by the display unit 9. For example, this mechanism is a mechanism that changes an optical path length from an image projection unit 91 to the windshield 102. If the distance from the vehicle 100 to the predetermined position is small, the display unit 9 including the adjusting mechanism may set the image formation position of the virtual image VI at a position near the driver 200 compared with a case where the distance from the vehicle 100 to the predetermined position is large.

Figure 11:
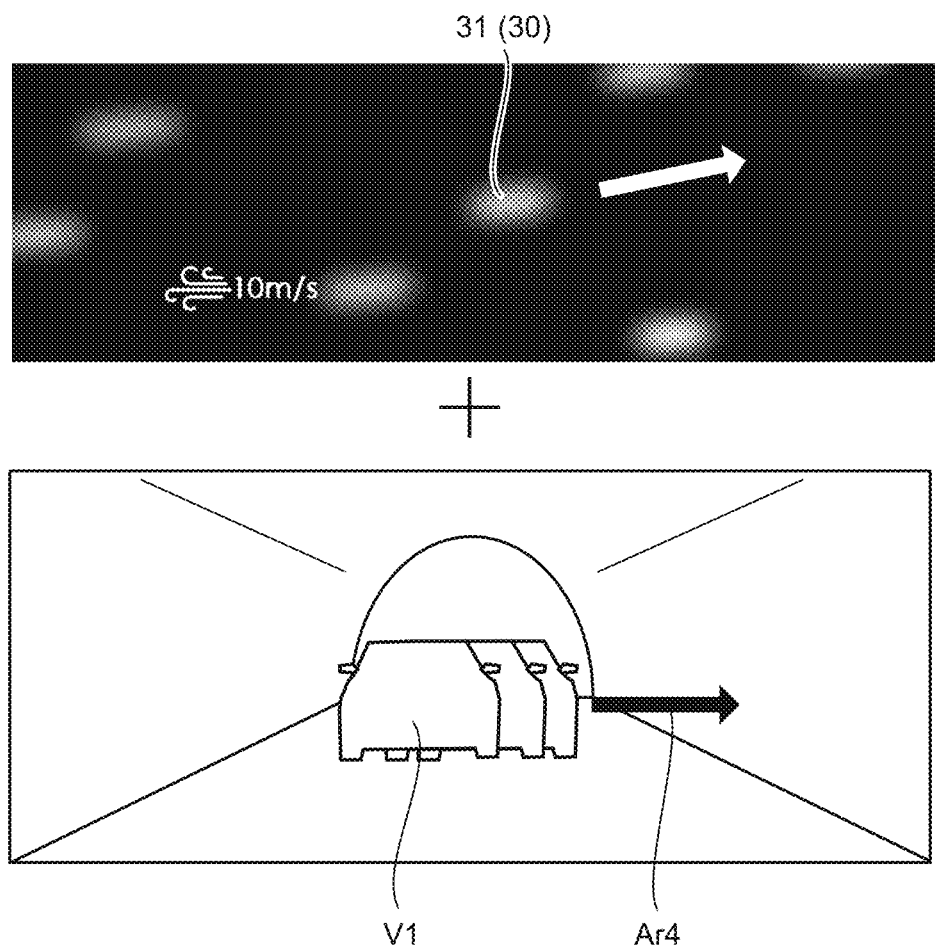
FIG. 11 is an explanatory diagram of a first animation.

The vehicle display device 1 according to the present embodiment has a function of playing an animation expressing the predicted behavior of the vehicle 100. In the description below, the animation expressing the predicted behavior of the vehicle 100 is referred to as "first animation". FIG. 11 illustrates one example of the first animation expressing the travel to the exit of the tunnel.

The first animation is played based on the prediction result from the prediction unit 6. For example, it is assumed that the prediction unit 6 predicts the vehicle 100 drifts to the right as indicated by an arrow Ar4 due to the side wind at the exit of the tunnel. In this case, the generation unit 8 generates the animation in which a virtual image V1 expressing the vehicle 100 (hereinafter referred to as "first virtual image" simply) moves from left to right. The first virtual image V1 has a shape similar to the vehicle 100. The first virtual image V1 is displayed in white or white-like color, for example. The first animation expresses the drifting behavior of the vehicle 100.

In the case where the vehicle 100 is predicted to drift to the left, the generation unit 8 may generate the animation in which the first virtual image V1 moves from right to left. The first animation in this case corresponds to the animation expressing the behavior that the vehicle 100 drifts to the left. The first virtual image V1 is displayed overlapping with the position where the vehicle 100 is predicted to exist in the future. The predicted position of the vehicle 100 is calculated based on the vehicle speed of the vehicle 100. The display position of the first virtual image V1 is, for example, the position where the vehicle 100 will exist a few seconds later, and may be a position ahead of the current position of the vehicle 100, for example at the exit of the tunnel.

The vehicle display device 1 according to the present embodiment generates a display screen by combining the display figure 30 and the first virtual image V1. That is to say, the vehicle display device 1 plays the animation of the display figure 30 and the first animation at the same time. However, the first animation may be played without the animation of the display figure 30.

The generation unit 8 may display the first virtual image V1 in different modes depending on rainfall or snowfall. As illustrated in FIG. 12, at rainfall, the Generation unit 8 overlaps a virtual image Vr with a wavy shape on a lower part of the first virtual image V1. The virtual image Vr is an image that notifies the driver that the road surface at the predetermined position is wet or submerged. At snowfall, the generation unit 8 overlaps a virtual image Vs with a flat shape on the lower part of the first virtual image V1. The virtual image Vs is an image that notifies the driver that the road surface at the predetermined position is covered with snow.

Figure 13:
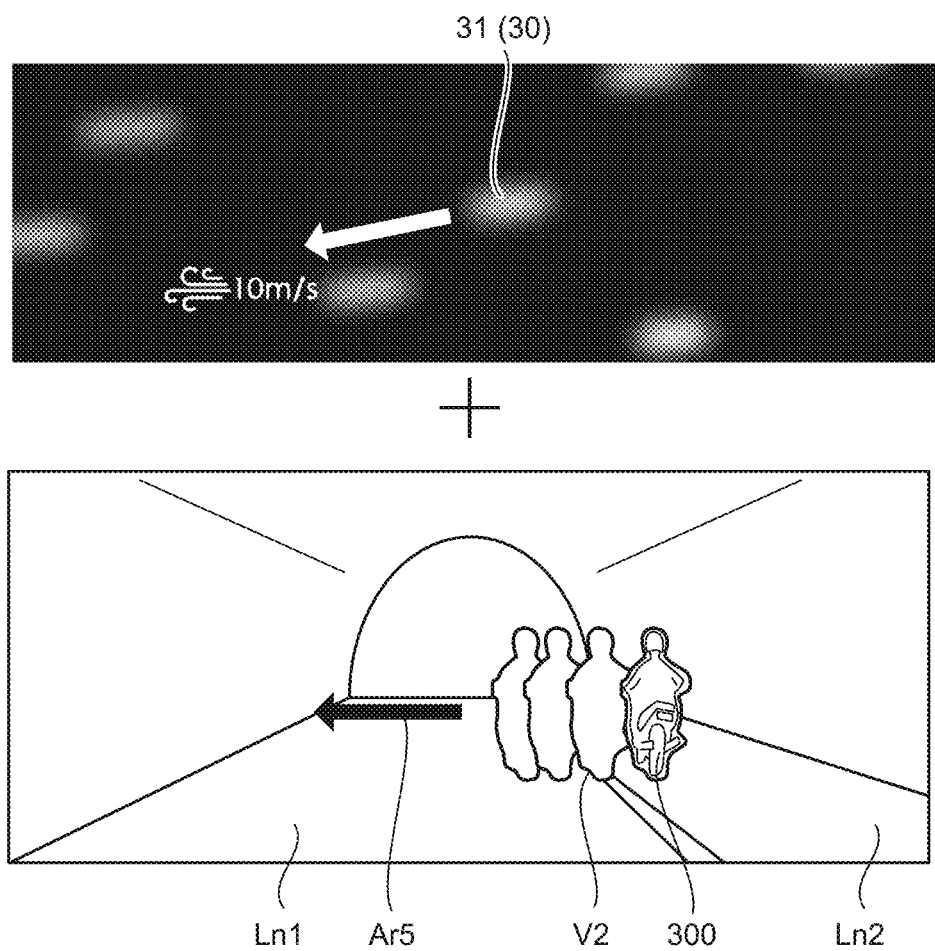
FIG. 13 is an explanatory diagram of a second animation.

The vehicle display device 1 may be configured to play a second animation to be described below instead of the first animation. The second animation expresses the predicted behavior of another vehicle. FIG. 13 illustrates one example of the second animation expressing the travel to the exit of the tunnel. In FIG. 13, a lane Ln1 is a lane where the vehicle 100 travels. Another vehicle 300 is a two-wheeled vehicle traveling in the next lane Ln2. The other vehicle 300 exists obliquely ahead of the vehicle 100 and travels along the same traveling direction Y as the vehicle 100.

The second animation is played based on the prediction result from the prediction unit 6. For example, it is assumed that the prediction unit 6 predicts the other vehicle 300 drifts to the left as indicated by an arrow Ar5 due to the side wind at the exit of the tunnel. In this case, the generation unit 8 generates the animation in which a virtual image V2 expressing the other vehicle 300 (hereinafter referred to as "second virtual image" simply) moves from right to left. The second virtual image V2 has a shape similar to the other vehicle 300. The second virtual image V2 is, for example, an image with a colored frame and without a color inside the frame. The second animation corresponds to the animation expressing the drifting behavior of the other vehicle 300. The direction to which the other vehicle 300 drifts is a direction of approaching the lane Ln1 where the vehicle 100 travels. That is to say, the vehicle display device 1 plays the second animation when it is predicted that the other vehicle 300 drifts so as to get close to the vehicle 100.

Note that when the other vehicle 300 travels in the left lane of the vehicle 100, it is preferable to play the second animation in the case where the other vehicle 300 is predicted to drift to the right.

In the first frame of the second animation, the generation unit 8 displays the second virtual image V2 at the position overlapping with the other vehicle 300. In the subsequent frame, the generation unit 8 moves the second virtual image V2 from the position overlapping with the other vehicle 300 to the direction indicated by the arrow Ar5. This animation may be displayed repeatedly.

The vehicle display device 1 generates the display screen by combining the display figure 30 and the second virtual image V2, for example. That is to say, the vehicle display device 1 plays the animation of the display figure 30 and the second animation at the same time. However, the second animation may be played without the animation of the display figure 30.

Figure 14:
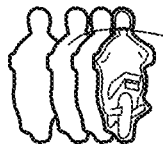
FIG. 14 is a diagram illustrating the second animation according to weather.

The generation unit 8 may display the second virtual image V2 in different modes depending on rainfall or snowfall. As illustrated in FIG. 14, at rainfall, the generation unit 8 overlaps the virtual image Vr with a wavy shape on a lower part of the second virtual image V2. At snowfall, the generation unit 8 overlaps the virtual image Vs with the flat shape on the lower part of the second virtual image V2.

The display unit 9 is a device that displays the display figure 30 ahead of the driver 200 in the vehicle 100. The display unit 9 in the present embodiment is a projector that displays the virtual image of the display figure 30 overlapping with the foreground of the vehicle 100 by the display light projected to the windshield 102 of the vehicle 100. As illustrated in FIG. 1, the display unit 9 includes an image projection unit 91 and a mirror 92. The image projection unit 91 generates the display light of the image including the display figure 30 on the basis of the image information generated by the generation unit 8.

The image projection unit 91 is, for example, a liquid crystal display device such as a thin film transistor-liquid crystal display (TFT-LCD). In this case, the image projection unit 91 includes a liquid crystal display unit that displays an image and the liquid crystal display unit emits the display light. However, the image projection unit 91 is not limited to the liquid crystal display device, and for example, may be a device that generates an image on a screen with laser light. In this case, the image projection unit 91 emits the display light of the image from the screen.

The mirror 92 is a reflection member that reflects the display light emitted from the image projection unit 91 toward the windshield 102. The mirror 92 has a reflection surface that reflects the display light. The shape of the reflection surface is, for example, a free-form surface. The mirror 92 is preferably a magnifying mirror that reflects the display light while magnifying the display light. The windshield 102 reflects the display light toward the eye point 201 of the driver 200. The mirror 92 reflects the display light to a region of the windshield 102 that overlaps with the foreground of the vehicle 100. Therefore, the formed virtual image VI is displayed overlapping with the foreground of the vehicle 100.

Figure 15:
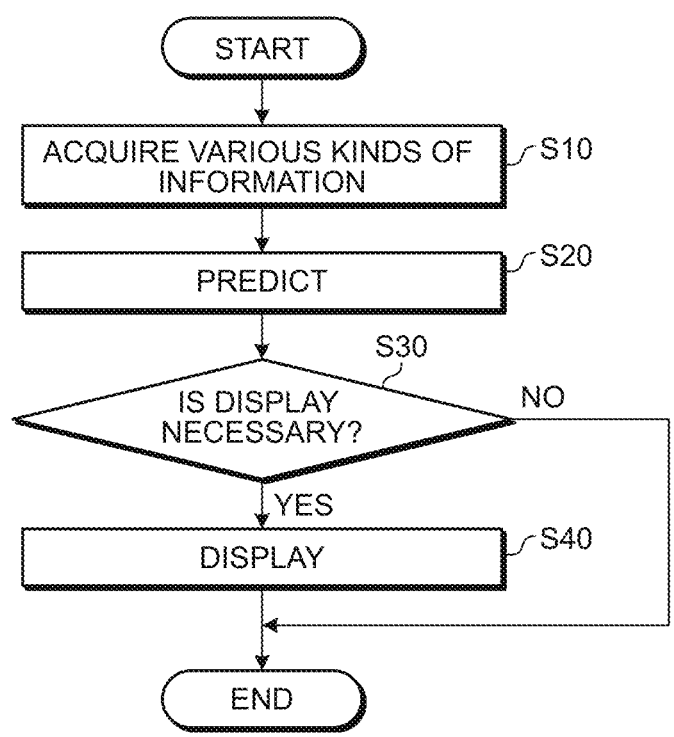
FIG. 15 is a flowchart according to the embodiment.

With reference to a flowchart in FIG. 15, the operation of the vehicle display device 1 is described. At step S10, various kinds of information are acquired. The first acquisition unit 2 acquires weather information, road information, and traffic information through the communication unit 110. The second acquisition unit 3 acquires information about other vehicles and road information from the on-vehicle sensor 120. The travel information acquisition unit 4 acquires the travel information about vehicle speed or steering angle. The navigation information acquisition unit 5 acquires the current travel position, map information, route guide information, and the like from the navigation device 130. Step S10 is followed by step S20.

At step S20, the prediction unit 6 predicts the travel routes, risks, behaviors, and the like. For example, the prediction unit 6 predicts the travel route of the vehicle 100 on the basis of the current travel position of the vehicle 100, the map information, the guide route, the vehicle speed and steering angle of the vehicle 100, and the like. The prediction unit 6 may predict the travel route of another vehicle. For example, the prediction unit 6 can predict the travel route of another vehicle and the future position of the other vehicle on the basis of the relative position and relative speed of the other vehicle acquired from the on-vehicle sensor 120. In addition, the prediction unit 6 predicts the risk and behavior on the basis of the information acquired at step S10.

In the case where the vehicle display device 1 is configured to play the first animation, the prediction unit 6 predicts the behavior of the vehicle 100. The prediction unit 6 predicts the behavior of the vehicle 100 on the basis of the wind speed ahead of the vehicle 100, for example. In the case where the wind speed ahead is high, it can be predicted that the behavior of the vehicle 100 becomes unstable. For example, at an exit of a tunnel, an underpass, a bridge, an elevated road, a coastal road, a building area, a mountain road, or the like, the vehicle 100 may travel in the strong wind or the wind pressure on the vehicle 100 may suddenly change. In the description below, the place where the vehicle 100 tends to travel in the strong wind or the wind pressure on the vehicle 100 tends to suddenly change is referred to as a caution-needed place. For example, when there is a caution-needed place ahead of the vehicle 100 and the wind is blowing at the caution-needed place, the prediction unit 6 predicts that the behavior of the vehicle 100 becomes unstable. The prediction unit 6 can predict the direction where the vehicle 100 drifts on the basis of the wind direction, and predict the drifting quantity of the vehicle 100 on the basis of the wind speed.

The prediction unit 6 may predict the behavior of the vehicle 100 on the basis of the road information ahead of the vehicle 100. In one example, the prediction unit 6 predicts that the behavior of the vehicle 100 becomes unstable when the road surface ahead of the vehicle 100 is frozen, when the road surface ahead of the vehicle 100 has a puddle, or when the road surface ahead of the vehicle 100 is submerged. In another example, the prediction unit 6 predicts that the behavior of the vehicle 100 becomes unstable when there is sand on the road surface ahead of the vehicle 100 or when the pavement of the road ahead of the vehicle 100 is rough. The prediction unit 6 may predict that the behavior of the vehicle 100 becomes unstable when there is an obstacle on the road surface ahead of the vehicle 100. How unstable the behavior of the vehicle 100 will become can be predicted based on the risk to be described below, for example.

In the case where the vehicle display device 1 is configured to be able to play the second animation, the prediction unit 6 predicts the behavior of the other vehicle 300. The prediction unit 6 predicts the behavior of the other vehicle 300 on the basis of the wind speed ahead of the other vehicle 300. When the wind speed ahead is high, the behavior of the other vehicle 300 can be predicted to become unstable. In the case where there is a caution-needed place ahead of the other vehicle 300 and wind is blowing in that caution-needed place, the prediction unit 6 predicts that the behavior the other vehicle 300 becomes unstable. The prediction unit 6 can predict the direction where the other vehicle 300 drifts on the basis of the wind direction, and predict the drifting quantity of the other vehicle 300 on the basis of the wind speed.

The prediction unit 6 may predict the behavior of the other vehicle 300 on the basis of the road information ahead of the other vehicle 300. In one example, the prediction unit 6 predicts that the behavior of the other vehicle 300 becomes unstable when the road surface ahead of the other vehicle 300 is frozen, when the road surface ahead of the other vehicle 300 has a puddle, or when the road surface ahead of the other vehicle 300 is submerged. In another example, the prediction unit 6 predicts that the behavior of the other vehicle 300 becomes unstable when there is sand on the road surface ahead of the other vehicle 300 or when the pavement of the road ahead of the other vehicle 300 is rough. The prediction unit 6 may predict that the behavior of the other vehicle 300 becomes unstable when there is an obstacle on the road surface ahead of the other vehicle 300. How unstable the behavior of the other vehicle 300 becomes can be predicted based on the risk to be described below, for example.

The prediction unit 6 can determine the risk in accordance with the strength of the wind at the predetermined position, for example. In this case, when the wind speed at the predetermined position is more than or equal to a threshold, the prediction unit 6 can determine that the risk at the predetermined position is high. When the risk based on the strength of the wind is high, the behavior of the vehicle 100 and the behavior of the other vehicle 300 tend to become unstable.

When the speed of the vehicle 100 is high, the behavior of the vehicle 100 tends to become unstable despite the same wind speed. The prediction unit 6 may determine the risk on the basis of the vehicle speed of the vehicle 100 in addition to the wind speed at the predetermined position. In this case, the prediction unit 6 determines the risk on the basis of a map illustrated in FIG. 16, for example.

Figure 16:
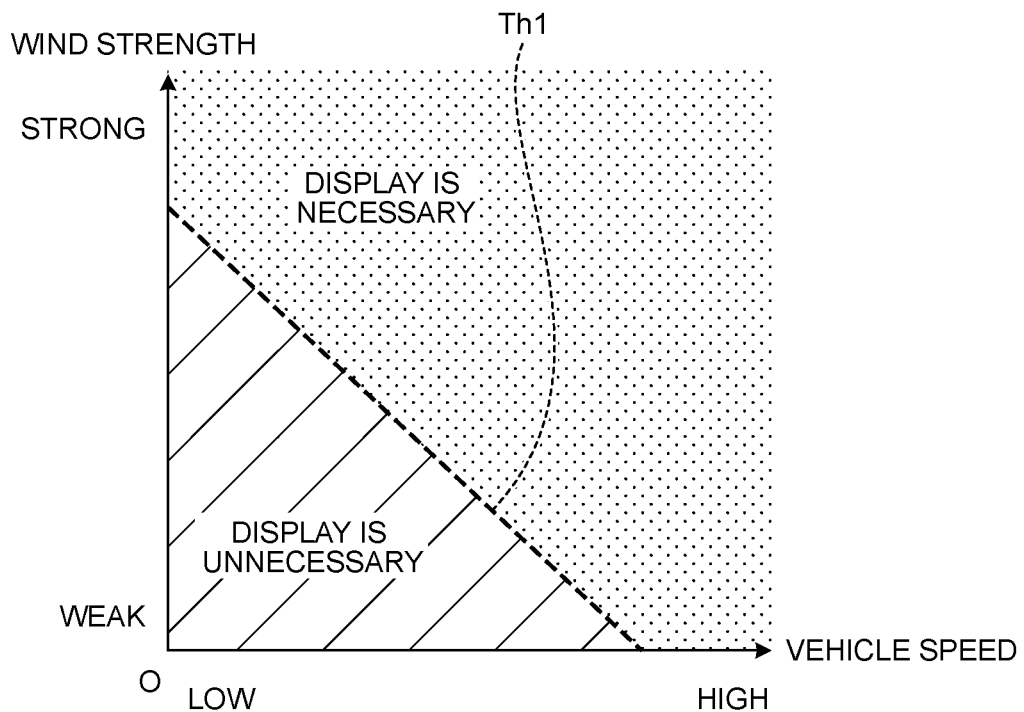
FIG. 16 is a map used to determine the risk.
Figure 17:
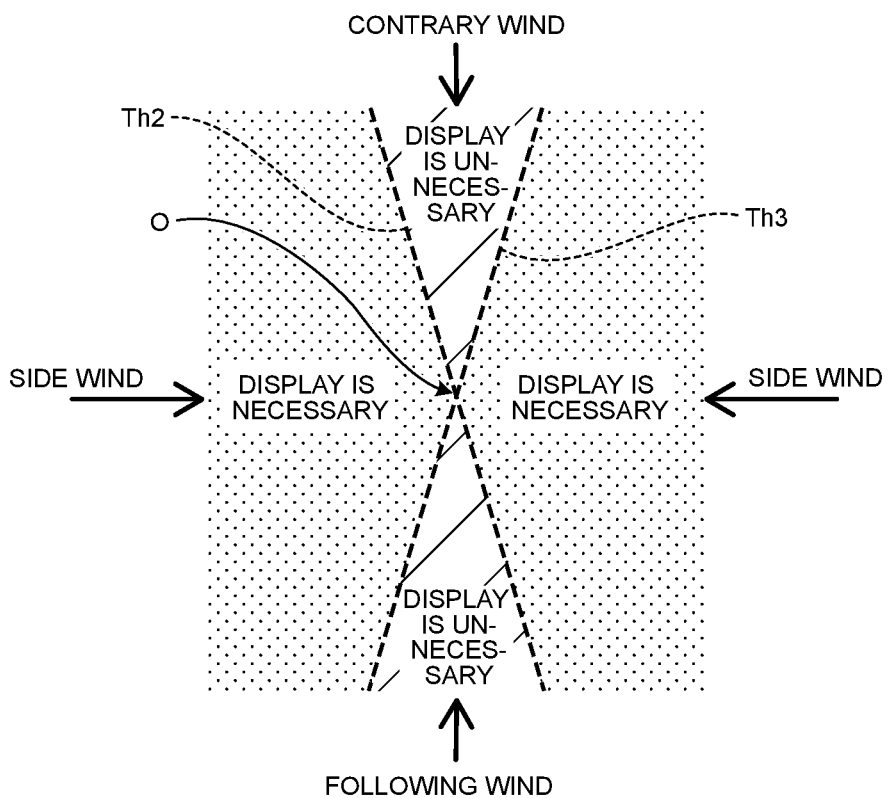
FIG. 17 is a map used to determine the risk.

In FIG. 16, the horizontal axis represents the vehicle speed of the vehicle 100 and the vertical axis represents the strength of the wind at the predetermined position. The strength of the wind may be the wind speed along the wind direction or the wind speed of the side wind at the predetermined position. A border line Th1 is a criterion as to whether the alert including the display figure 30, the first animation, and the second animation needs to be displayed. The display is determined to be unnecessary when the point based on the vehicle speed and the wind strength is closer to the origin O than the border line Th1. On the other hand, the display is determined to be necessary when the point based on the vehicle speed and the wind strength is on the opposite side of the origin relative to the border line Th1. Note that the border line Th1 in this example is a straight line; however, the line is not limited to the straight line. In the determination based on the border line Th1, hysteresis is provided so that the hunting of the control can be suppressed.

Note that when the vehicle display device 1 is configured to be able to play the second animation, the necessity of the second animation can be determined based on a map similar to the map in FIG. 16. In this case, the horizontal axis of the map represents the vehicle speed of the other vehicle 300. As the speed of the other vehicle 300 is higher, the behavior of the other vehicle 300 is predicted to become unstable despite the same wind strength.

The prediction unit 6 may determine the risk on the basis of the wind direction at the predetermined position in addition to the wind speed at the predetermined position. In this case, the prediction unit 6 determines the risk on the basis of the map illustrated in FIG. 17, for example. In the map in FIG. 17, the value along the horizontal axis direction represents the strength of the side wind at the predetermined position and the value along the vertical axis represents the strength of the wind along the traveling direction Y at the predetermined positon. The point in the region on the left side of the origin O represents the side wind to the right. The point in the region on the right side of the origin O represents the side wind to the left. The point in the region below the origin O represents the following wind. The point in the region above the origin O represents the contrary wind. Border lines Th2 and Th3 serve as the criteria as to whether the alert including the display figure 30, the first animation, and the second animation needs to be displayed. In a region where the side wind is stronger relative to the border lines Th2 and Th3, the display is determined to be necessary. On the other hand, in a region between the border lines Th2 and Th3 in the horizontal axis direction, the display is determined to be unnecessary.

The prediction unit 6 may determine the risk on the basis of the road surface condition at the predetermined position in addition to the wind speed at the predetermined position. The road surface condition indicates, for example, how slippery the road surface is and corresponds to the freezing of the road surface, sand on the road surface, the pavement condition, and the like. The border line Th1 in FIG. 16 and the border lines Th2 and Th3 in FIG. 17 may be changed in accordance with the slipperiness of the road surface. When the road surface is slippery, the values of the border line Th1 and the border lines Th2 and Th3 are set so that the risk is found more easily than when the road surface is not slippery.

For example, when the road surface is slippery, the border line Th1 in FIG. 16 may be set close to the origin O compared to when the road surface is not slippery. For example, when the road surface is slippery, the border lines Th2 and Th3 may be set closer to each other in the horizontal axis direction than when the road surface is not slippery.

The border line Th1 and the border lines Th2 and Th3 may be changed in accordance with the driving state of the driver 200. For example, while the driver 200 is in a hands-off state, that is, the driver 200 does not hold the steering wheel, the values of the border line Th1 and the border lines Th2 and Th3 are set so that the risk is found more easily than when the driver 200 holds the steering wheel.

One example of the situation where the driver 200 is in the hands-off state is that the vehicle 100 is in the automatic driving state. In this case, whether the risk is easily found may be set in accordance with the level of the automatic driving. For example, the values of the border line Th1 and the border lines Th2 and Th3 are set so that the risk is found easily in the automatic driving state in which the driver is responsible.

The border line Th1 and the border lines Th2 and Th3 may be changed in accordance with the vehicle type of the other vehicle 300. For example, when the other vehicle 300 is a two-wheeled vehicle, the values of the border line Th1 and the border lines Th2 and Th3 may be set so that the risk is found more easily than when the other vehicle 300 is an automobile other than the two-wheeled vehicle. For example, in the case where the necessity of the second animation is determined based on the map similar to the map in FIG. 16, when the other vehicle 300 is a two-wheeled vehicle, the border line Th1 may be set closer to the origin O compared to when the other vehicle 300 is an automobile other than the two-wheeled vehicle. As a result, when the other vehicle 300 is a two-wheeled vehicle, the behavior of the other vehicle 300 is determined to become unstable easily compared to when the other vehicle 300 is an automobile other than the two-wheeled vehicle despite the same wind speed.

The prediction by the prediction unit 6 at step S20 is followed by step S30. At step S30, the display control unit 7 determines the necessity, of the display. The display control unit 7 determines whether to display the alert including the display figure 30, the first animation, and the second animation on the basis of the information acquired at step S10 and the prediction result at step S20, for example. The display control unit 7 determines to display the alert when, for example, the display of the alert by the prediction unit 6 is determined to be necessary. The display control unit 7 may determine the necessity of the display in accordance with the strength of the wind at the current position and the relation with the other vehicle in addition to the prediction result from the prediction unit 6. In this case, the display control unit 7 determines that the display is necessary when the following first condition, second condition, or third condition is satisfied, for example.

The first condition is that the wind at the current position of the vehicle 100 is stable but the state at the predetermined position right ahead is predicted to be dangerous. The second condition is that the wind at the current position of the vehicle 100 is at the dangerous level and the vehicle 100 is predicted to travel beside another vehicle in the next lane at a place right ahead. The third condition is that the wind at the current position of the vehicle 100 is at the dangerous level and the vehicle 100 is predicted to pass another vehicle in the next lane at a place right ahead. Note that the distance from the current position to the place right ahead is, for example, the distance of such a degree that the driver 200 can see that place. In other words, the place right ahead is in the range where the driver 200 can recognize visually.

If the display is determined to be necessary at step S30, the process advances to step S40 and if the display is determined to be unnecessary at step S30, the flowchart ends once.

At step S40, the generation unit 8 generates a display screen. The generation unit 8 generates the display screen by combining the display figure 30 and the icon 40, for example. In the case of playing the first animation, the generation unit 8 generates the display screen by combining the display figure 30, the icon 40, and the image of the first virtual image V1. In the case of playing the second animation, the generation unit 8 generates the display screen by combining the display figure 30, the icon 40, and the image of the second virtual image V2. The generation unit 8 outputs the generated display screen to the display unit 9. The display unit 9 projects the display light of the display screen acquired from the generation unit 8 toward the windshield 102. After step S40 is per formed, the flowchart ends once.

Note that the display unit 9 is not limited to the display unit of displaying the virtual image VI overlapping with the foreground of the vehicle 100. That is to say, the virtual image VI may be displayed at the position not overlapping with the foreground. The display unit 9 not limited to the device of displaying the virtual image VI. The display unit 9 may be a device that enables the driver 200 to see an actual image displayed on the screen, for example. In this case, the screen of the display unit 9 is disposed at the place ahead of the driver 200 where the driver 200 can see. The display unit 9 may be a part of a meter device or may be disposed adjacent to the meter device, for example.

As described above, the vehicle display device 1 according to the present embodiment includes the first acquisition unit 2, the second acquisition unit 3, the prediction unit 6, and the display unit 9. The first acquisition unit 2 and the second acquisition unit 3 are examples of the acquisition unit that acquires the travel environment. The prediction unit 6 predicts the behavior of the other vehicle 300 traveling ahead of the vehicle 100 on the basis of the travel environment. When the behavior of the other vehicle 300 is predicted to become unstable, the display unit 9 displays the predicted behavior of the other vehicle 300 to the driver 200 in the vehicle 100. The vehicle display device 1 according to the present embodiment can intuitively notifies the driver 200 of the influence of the travel environment on the driver's vehicle.

In the present embodiment, the travel environment includes the information about the wind speed ahead. The prediction unit 6 predicts the behavior of the other vehicle 300 on the basis of the information about the wind speed. The vehicle display device 1 according to the present embodiment can predict the influence on the vehicle 100 more properly by predicting the behavior of the other vehicle 300 in consideration of the wind speed.

The other vehicle 300 in the present embodiment is the vehicle traveling in the lane Ln2 next to the vehicle 100. The prediction unit 6 predicts that the behavior of the other vehicle 300 becomes unstable when the side wind is blowing from the lane Ln2 where the other vehicle 300 travels to the lane Ln1 where the vehicle 100 travels. Therefore, the vehicle display device 1 according to the present embodiment can display the behavior of the other vehicle 300 when the influence on the vehicle 100 tends to become large.

In the present embodiment, the travel environment includes the information about the state of the road surface ahead. The prediction unit 6 predicts the behavior of the other vehicle 300 on the basis of the information about the state of the road surface. Therefore, the vehicle display device 1 according to the present embodiment can predict the behavior of the other vehicle 300 more properly.

The first acquisition unit 2 according to the present embodiment acquires the vehicle type of the other vehicle 300. The prediction unit 6 predicts that the behavior of the other vehicle 300 becomes unstable when the other vehicle 300 is a two-wheeled vehicle.

Note that when the vehicle display device 1 is configured to play the first animation, the prediction unit 6 predicts the behavior of the vehicle 100 that is the driver's vehicle on the basis of the travel environment. The display unit 9 displays the predicted behavior of the vehicle 100 to the driver 200 of the vehicle 100 when the behavior of the vehicle 100 is predicted to become unstable. Accordingly, the vehicle display device 1 according to the present embodiment can intuitively notifies the driver 200 of the influence of the travel environment on the driver's vehicle.

Modification of Embodiment

The shape and the display position of the first virtual image V1 are not limited to the shape and the display position described in the embodiment. In the first animation, the moving direction of the first virtual mage V1 is not limited to one direction. For example, if the behavior of the vehicle 100 is predicted to become unstable because the road surface ahead is slippery, the generation unit 8 may move the first virtual image V1 alternately to the left and right in the first animation.

Whether to play the first animation and whether to display the display figure 30 may be determined independently. For example, when the wind at the predetermined position is weak and the road surface is slippery, the vehicle display device 1 may play the first animation without the display of the display figure 30.

The shape and the display position of the second virtual image V2 are not limited to the shape and the display position described in the embodiment. In the second animation, the moving direction of the second virtual image V2 is not limited to one direction. For example, if the behavior of the other vehicle 300 is predicted to become unstable because the road surface ahead is slippery, the generation unit 8 may move the second virtual image V2 alternately to the left and right in the second animation.

Whether to play the second animation and whether to display the display figure 30 may be determined independently. For example, when the wind at the predetermined position is weak and the road surface is slippery, the vehicle display device 1 may play the second animation without the display of the display figure 30.

The contents disclosed in the embodiment and modification described above can be combined and performed as appropriate.

The vehicle display device according to the present embodiment includes the prediction unit that predicts the behavior of the other vehicle traveling ahead of the vehicle of the driver on the basis of the travel environment, and the display unit that, when the behavior of the other vehicle is predicted to become unstable, displays the predicted behavior of the other vehicle to the driver of the vehicle. The vehicle display device according to the present embodiment is advantageous in that the driver can be notified intuitively of the influence of the travel environment on the driver's vehicle.

The vehicle display device according to the present embodiment includes the prediction unit that predicts the behavior of the vehicle on the basis of the travel environment, and the display unit that, when the behavior of the vehicle is predicted to become unstable, displays the predicted behavior of the vehicle to the driver of the vehicle. The vehicle display device according to the present embodiment is advantageous in that the driver can be notified intuitively of the influence of the travel environment on the driver's vehicle.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle display device comprising:
an acquisition unit that is configured to acquire at least one condition of a travel environment when a vehicle is driven by a driver in the travel environment and another vehicle travels in the travel environment ahead of the vehicle driven by the driver;
a prediction unit predicts a behavior of the other vehicle when the other vehicle is traveling ahead of the vehicle of the driver, based on the travel environment; and
a display unit that, when the behavior of the other vehicle is predicted to become unstable, displays an animation expressing the predicted behavior of the other vehicle to the driver of the vehicle, wherein
in the animation, the display unit moves a virtual image expressing the other vehicle from a position overlapping with the other vehicle toward a predicted drift direction of the other vehicle.

2. The vehicle display device according to claim 1, wherein
the at least one condition of the travel environment includes information about wind speed ahead, and
the prediction unit predicts the behavior of the other vehicle, based on the information about the wind speed.

3. The vehicle display device according to claim 2, wherein
the other vehicle is a vehicle traveling in a lane next to the vehicle of the driver, and
the prediction unit predicts that the behavior of the other vehicle becomes unstable when a side wind blows from the lane where the other vehicle travels to a lane where the vehicle of the driver travels.

4. The vehicle display device according to claim 3, wherein
the at least one condition of the travel environment includes information about a state of a road surface ahead, and
the prediction unit predicts the behavior of the other vehicle, based on the information about the state of the road surface.

5. The vehicle display device according to claim 2, wherein
the at least one condition of the travel environment includes information about a state of a road surface ahead, and
the prediction unit predicts the behavior of the other vehicle, based on the information about the state of the road surface.

6. The vehicle display device according to claim 1, wherein
the at least one condition of the travel environment includes information about a state of a road surface ahead, and
the prediction unit predicts the behavior of the other vehicle, based on the information about the state of the road surface.

7. A vehicle display device comprising:
an acquisition unit that acquires weather information that includes a wind speed and a wind direction;
a prediction unit that predicts a drift direction and a position of a vehicle, based on the weather information and the speed of the vehicle; and
a display unit that displays to a driver of the vehicle an animated virtual image of the vehicle that moves in the drift direction, the animated virtual image includes a virtual image of the vehicle that overlaps with the position of the vehicle that is predicted by the prediction unit.

* * * * *